United States Patent
Piefer et al.

(10) Patent No.: US 11,361,873 B2
(45) Date of Patent: Jun. 14, 2022

(54) AQUEOUS ASSEMBLY AND CONTROL METHOD

(71) Applicant: SHINE MEDICAL TECHNOLOGIES, INC., Monona, WI (US)

(72) Inventors: Gregory Piefer, Middleton, WI (US); Eric N. Van Abel, Oregon, WI (US)

(73) Assignee: SHINE Technologies, LLC, Janesville, WI (US)

( * ) Notice: Subject to any disclaimer, the term of this patent is extended or adjusted under 35 U.S.C. 154(b) by 742 days.

(21) Appl. No.: 14/390,658

(22) PCT Filed: Mar. 15, 2013

(86) PCT No.: PCT/US2013/031837
§ 371 (c)(1),
(2) Date: Oct. 3, 2014

(87) PCT Pub. No.: WO2013/187974
PCT Pub. Date: Dec. 19, 2013

(65) Prior Publication Data
US 2015/0092900 A1 Apr. 2, 2015

Related U.S. Application Data

(60) Provisional application No. 61/620,735, filed on Apr. 5, 2012.

(51) Int. Cl.
*G21C 1/30* (2006.01)
*G21G 1/00* (2006.01)
(Continued)

(52) U.S. Cl.
CPC ............. *G21G 1/0005* (2013.01); *G21C 1/26* (2013.01); *G21C 1/30* (2013.01); *G21C 3/42* (2013.01);
(Continued)

(58) Field of Classification Search
CPC . G21G 1/005; G21G 1/08; G21C 1/26; G21C 1/30; G21C 3/42; G21C 7/02; G21C 7/34; G21C 3/46; G21C 1/24
See application file for complete search history.

(56) References Cited

U.S. PATENT DOCUMENTS 2,161,985 A 6/1939 Szilard
2,837,476 A 6/1958 Busey
(Continued)

FOREIGN PATENT DOCUMENTS

CA 2294063 12/1998
CN 1134197 10/1996
(Continued)

OTHER PUBLICATIONS

Keele, L. D., and C. R. Schmitt. "Solubility relations of uranyl fluoride-hydrofluoric acid-boric acid." Journal of Chemical and Engineering Data 17.3 (1972): 330-332. (Year: 1972).*
(Continued)

*Primary Examiner* — Lily C Garner
(74) *Attorney, Agent, or Firm* — Michael Best & Friedrich LLP (57) ABSTRACT

An aqueous assembly has a negative coefficient of reactivity with a magnitude. The aqueous assembly includes a vessel and an aqueous solution, with a fissile solute, supported in the vessel. A reactivity stabilizer is disposed within the aqueous solution to reduce the magnitude of the negative coefficient of reactivity of the aqueous assembly during operation of the aqueous assembly.

24 Claims, 5 Drawing Sheets

(51) Int. Cl.
  *G21G 1/08* (2006.01)
  *G21C 3/42* (2006.01)
  *G21C 1/26* (2006.01)
  *G21C 7/34* (2006.01)
  *G21C 7/02* (2006.01)
  *G21C 1/24* (2006.01)

(52) U.S. Cl.
  CPC ............... *G21C 7/02* (2013.01); *G21C 7/34* (2013.01); *G21G 1/08* (2013.01); *G21C 1/24* (2013.01); *Y02E 30/30* (2013.01)

(56) References Cited

U.S. PATENT DOCUMENTS

| | | |
|---|---|---|
| 2,853,446 A | 9/1958 | Abbott et al. |
| 2,907,884 A | 10/1959 | Gale |
| 2,992,333 A | 7/1961 | Gale |
| 3,030,543 A | 4/1962 | Luce |
| 3,079,319 A * | 2/1963 | McGrath ............... G21C 1/26 376/214 |
| 3,085,966 A | 4/1963 | Flora |
| 3,218,235 A | 11/1965 | Ehler |
| 3,255,092 A * | 6/1966 | Dee, Jr. ............... G21C 7/10 376/333 |
| 3,258,402 A | 6/1966 | Farnsworth |
| 3,276,965 A | 10/1966 | Leyse |
| 3,386,883 A | 6/1968 | Farnsworth |
| 3,418,206 A | 12/1968 | Hall et al. |
| 3,448,314 A | 6/1969 | Bounden et al. |
| 3,473,056 A | 10/1969 | Ferry |
| 3,530,497 A | 9/1970 | Hirsch et al. |
| 3,617,908 A | 11/1971 | Greber |
| 3,624,240 A | 11/1971 | Damm et al. |
| 3,629,588 A | 12/1971 | Eyrich |
| 3,634,704 A | 1/1972 | Stix et al. |
| 3,663,858 A | 5/1972 | Lisitano |
| 3,668,066 A | 6/1972 | Hendel et al. |
| 3,676,672 A | 7/1972 | Meckel et al. |
| 3,713,967 A | 1/1973 | Hamilton et al. |
| 3,718,836 A | 2/1973 | Bain et al. |
| 3,719,893 A | 3/1973 | dePackh |
| 3,746,859 A | 7/1973 | Hilton et al. |
| 3,794,875 A | 2/1974 | Stark |
| 3,799,883 A | 3/1974 | Arino et al. |
| 3,860,482 A * | 1/1975 | Wheelock ............... G21C 7/22 376/219 |
| 3,925,676 A | 12/1975 | Bigham et al. |
| 3,992,625 A | 11/1976 | Schmidt et al. |
| 4,008,411 A | 2/1977 | Brugger et al. |
| 4,137,012 A | 1/1979 | Porta et al. |
| 4,147,590 A | 4/1979 | Szekely |
| 4,202,725 A | 5/1980 | Jarnagin |
| 4,311,912 A | 1/1982 | Givens |
| 4,314,879 A | 2/1982 | Hartman et al. |
| 4,370,295 A | 1/1983 | Bussard |
| 4,431,580 A | 2/1984 | Schneider et al. |
| 4,528,003 A | 7/1985 | Dittrich et al. |
| 4,529,571 A | 7/1985 | Bacon et al. |
| 4,650,630 A | 3/1987 | Boyer |
| 4,663,110 A | 5/1987 | Cheng |
| 4,752,432 A | 6/1988 | Bida et al. |
| 4,793,961 A | 12/1988 | Ehlers et al. |
| 4,800,060 A | 1/1989 | Goldring |
| 4,826,646 A | 5/1989 | Bussard |
| 4,853,173 A | 8/1989 | Stenbacka |
| 4,976,938 A | 12/1990 | Knize et al. |
| 5,037,602 A | 8/1991 | Dabiri et al. |
| 5,053,184 A | 10/1991 | Cluzeau et al. |
| 5,126,574 A | 6/1992 | Gallagher |
| 5,152,956 A | 10/1992 | Bernardet et al. |
| 5,215,703 A | 6/1993 | Bernardet |
| 5,280,505 A | 1/1994 | Hughey et al. |
| RE34,575 E | 4/1994 | Klinkowstein et al. |
| 5,410,574 A | 4/1995 | Masumoto et al. |
| 5,443,732 A | 8/1995 | Lahoda et al. |
| 5,468,355 A | 11/1995 | Shefer et al. |
| 5,482,865 A | 1/1996 | Ferrieri et al. |
| 5,508,010 A | 4/1996 | Sameh et al. |
| 5,586,153 A | 12/1996 | Alvord |
| 5,596,611 A | 1/1997 | Ball |
| 5,729,580 A | 3/1998 | Millspaugh |
| 5,745,536 A | 4/1998 | Brainard et al. |
| 5,745,537 A | 4/1998 | Verschoore |
| 5,812,621 A | 9/1998 | Takeda et al. |
| 5,854,531 A | 12/1998 | Young et al. |
| 5,870,447 A | 2/1999 | Powell et al. |
| 5,898,279 A | 4/1999 | Ezzedine et al. |
| 5,910,971 A | 6/1999 | Ponomarev-Stepnoy et al. |
| 5,920,601 A | 7/1999 | Nigg et al. |
| 5,940,461 A | 8/1999 | Takeda et al. |
| 5,977,554 A | 11/1999 | Smith et al. |
| 6,011,825 A | 1/2000 | Welch et al. |
| 6,141,395 A | 10/2000 | Nishimura et al. |
| 6,337,055 B1 | 1/2002 | Betenekov et al. |
| 6,417,634 B1 | 7/2002 | Bergstrom |
| 6,544,606 B1 | 4/2003 | Pennington et al. |
| 6,567,492 B2 | 5/2003 | Kiselev et al. |
| 6,593,686 B1 | 7/2003 | Yui |
| 6,777,699 B1 | 8/2004 | Miley et al. |
| 6,835,358 B2 | 12/2004 | Hemingway et al. |
| 6,845,137 B2 | 1/2005 | Ruth et al. |
| 6,850,011 B2 | 2/2005 | Monkhorst et al. |
| 6,870,894 B2 | 3/2005 | Leung et al. |
| 6,891,911 B2 | 5/2005 | Rostoker et al. |
| 6,907,097 B2 | 6/2005 | Leung |
| 6,917,044 B2 | 6/2005 | Amini |
| 6,922,455 B2 | 7/2005 | Jurczyk et al. |
| 6,925,137 B1 | 8/2005 | Forman |
| 7,200,198 B2 | 4/2007 | Wieland et al. |
| 7,230,201 B1 | 6/2007 | Miley et al. |
| 7,235,216 B2 | 6/2007 | Kiselev et al. |
| 7,342,988 B2 | 3/2008 | Leung et al. |
| 7,362,842 B2 | 4/2008 | Leung |
| 7,419,604 B1 * | 9/2008 | Atwood ............... B09C 1/002 210/724 |
| 7,968,838 B2 | 6/2011 | Dent |
| 7,978,804 B2 | 7/2011 | Groves et al. |
| 8,475,747 B1 | 7/2013 | Johnson et al. |
| 8,767,905 B2 * | 7/2014 | Neeley ............... G21G 1/0005 376/356 |
| 2002/0150193 A1 | 10/2002 | Leung et al. |
| 2003/0152186 A1 | 8/2003 | Jurczyk et al. |
| 2003/0223528 A1 | 12/2003 | Miley et al. |
| 2004/0100214 A1 | 5/2004 | Erdman |
| 2005/0061994 A1 | 3/2005 | Behrouz |
| 2005/0069076 A1 | 3/2005 | Bricault et al. |
| 2005/0082469 A1 | 4/2005 | Carlo |
| 2005/0129162 A1 | 6/2005 | Ruth et al. |
| 2006/0023829 A1 | 2/2006 | Schenter et al. |
| 2006/0062342 A1 | 3/2006 | Lepera et al. |
| 2006/0104401 A1 | 5/2006 | Jongen et al. |
| 2006/0017411 A1 | 10/2006 | Hamm |
| 2007/0036261 A1 | 2/2007 | Kim et al. |
| 2007/0108922 A1 | 5/2007 | Amaldi |
| 2007/0133734 A1 | 6/2007 | Fawcett et al. |
| 2007/0160176 A1 | 7/2007 | Wada |
| 2007/0273308 A1 | 11/2007 | Fritzler et al. |
| 2007/0297554 A1 | 12/2007 | Lavie et al. |
| 2008/0023645 A1 | 1/2008 | Amelia et al. |
| 2008/0224106 A1 | 9/2008 | Johnson et al. |
| 2009/0129532 A1 | 5/2009 | Reyes, Jr. et al. |
| 2009/0213977 A1 | 8/2009 | Russell, II et al. |
| 2009/0225923 A1 | 9/2009 | Neeley et al. |
| 2009/0279658 A1 | 11/2009 | Leblanc |
| 2009/0316850 A1 | 12/2009 | Langenbrunner |
| 2010/0063344 A1 | 3/2010 | Kotschenreuther et al. |
| 2010/0193685 A1 | 8/2010 | Chu et al. |
| 2010/0284502 A1 | 11/2010 | Piefer |
| 2011/0051876 A1 | 3/2011 | Ahfeld et al. |
| 2011/0091000 A1 | 4/2011 | Stubbers et al. |
| 2011/0176648 A1 | 7/2011 | Rowland et al. |
| 2011/0180698 A1 | 7/2011 | Stephenson |

(56) References Cited

U.S. PATENT DOCUMENTS

| | | |
|---|---|---|
| 2012/0300890 A1 | 11/2012 | Pfiefer |
| 2012/0300891 A1 | 11/2012 | Pfiefer |
| 2019/0105630 A1 | 4/2019 | Hasan |

FOREIGN PATENT DOCUMENTS

| | | | |
|---|---|---|---|
| CN | 1922695 | 2/2007 | |
| CN | 102084434 | 6/2011 | |
| EP | 535235 | 4/1993 | |
| EP | 0632680 | 1/1995 | |
| EP | 1134 771 | 9/2001 | |
| EP | 1233425 A1 | 8/2002 | |
| FR | 2711835 | 5/1995 | |
| GB | 829093 A * | 2/1960 | ......... C01B 15/0475 |
| GB | 869451 A * | 5/1961 | ............... G21C 3/46 |
| GB | 1187244 A * | 4/1970 | ............... B01J 2/08 |
| JP | 40-24599 | 10/1965 | |
| JP | 59068143 | 4/1984 | |
| JP | 03190097 | 8/1991 | |
| JP | 6160595 | 6/1994 | |
| JP | 09113693 | 5/1997 | |
| JP | 11057043 | 3/1999 | |
| JP | 2001042098 | 2/2001 | |
| JP | 3145555 B2 | 3/2001 | |
| JP | 2001338800 | 12/2001 | |
| JP | 2002062388 | 2/2002 | |
| JP | 2002214395 | 7/2002 | |
| JP | 2005127800 | 5/2005 | |
| JP | 2007165250 | 6/2007 | |
| JP | 2008102078 | 5/2008 | |
| RU | 2004115750 | 5/2005 | |
| WO | WO 91/14268 | 9/1991 | |
| WO | WO 98/59347 | 12/1998 | |
| WO | WO 01/03142 | 1/2001 | |
| WO | WO 01/31678 | 5/2001 | |
| WO | WO 03/019996 | 3/2003 | |
| WO | WO 04/053892 | 6/2004 | |
| WO | WO 06/000104 | 1/2006 | |
| WO | WO 06/015864 | 2/2006 | |
| WO | WO 07/002455 | 1/2007 | |
| WO | WO 07/040024 | 4/2007 | |
| WO | WO-2007055615 A2 * | 5/2007 | ............... G21C 3/50 |
| WO | WO 09/100063 | 8/2009 | |
| WO | WO 2009/135163 | 11/2009 | |
| WO | WO 2009/142669 | 11/2009 | |
| WO | WO-2009135163 A2 * | 11/2009 | ............... G21B 1/01 |
| WO | WO 2013187974 | 12/2013 | |

OTHER PUBLICATIONS

United States Patent Office Action for U.S. Appl. No. 13/460,033 dated Feb. 1, 2017 (10 pages).
United States Patent Office Action for U.S. Appl. No. 13/575,826 dated Feb. 21, 2017 (17 pages).
United States Patent Office Notice of Allowance for U.S. Appl. No. 12/990,758 dated Apr. 10, 2017 (8 pages).
Canadian Patent Office Action for Application No. 2,723,224 dated Mar. 30, 2017 (4 pages).
Japanese Patent Office Action for Application No. 2013-249823 dated Oct. 15, 2015 (6 pages) English translation only.
Canadian Patent Office Action for Application No. 2723224 dated Jun. 5, 2015 (5 pages).
Chinese Patent Office Action for Application No. 200980123452.6 dated Apr. 22, 2015 (7 pages, English translation included).
Korean Patent Office Action for Application No. 10-2016-7015856 dated Sep. 27, 2016 (11 pages with English translation).
Japanese Patent Office Action for Application No. 2013-249823 dated Aug. 16, 2016 (3 pages with English translation).
Russian Patent Office Action for Application No. 2014144290 dated Oct. 31, 2016 (12 pages with English translation).
Chinese Patent Office Action for Application No. 201380018865.4 dated Nov. 28, 2016 (17 pages with English translation).

"The Burr Amendment" "2005 Energy Act," Congressional Record, pp. S7237-S7244 (Jun. 23, 2005).
"The Schumer Amendment" "Comprehensive Report on H.R. 776" Congressional Record, p. H12103 (Oct. 5, 1992).
"U.S. Radioisotope Supply," American Nuclear Society Position Statement 30:(Jun. 2004).
Abraham, S., "Remarks by Energy Secretary Spencer Abraham on the Global Threat Reduction Initiative," Speech to the International Atomic Energy Agency, Vienna, Austria, (May 26, 2004).
Agostinelli, S., et al., "Geant4—A Simulation Toolkit," Nuclear Instruments and Methods in Physics Research A, 506:250-303 (2003).
Angelone, M. et al., "Conceptual Study of a Compact Accelerator-Driven Neutron Source for Radioisotope Production, Boron Neutron Capture Therapy and Fast Neutron Therapy," Nuc. Instr. & Methods in Physics Res. A:487:585-594 (2002).
Armstrong, D.D. et al., "Progress Report on Testing of a 100-kV, 125-mA Deuterium Injector," IEEE Transactions on Nuclear Science NS-26, No. 3 (1979).
Armstrong, D.D. et al., "Tests of the Intense Neutron Source Prototype" IEEE Transactions on Nuclear Science NS-26, No. 3 (1979).
Austen, I., "Reactor Shutdown Causing Medical Isotope Shortage," The New York Times, (Dec. 6, 2007).
Bakel, A.J. et al., "Thermoxid Sorbents for the Separation and Purification of 99Mo," 26th International Meeting on RERTR, Vienna, Austria, (Nov. 7-12, 2004).
Ball, R.M et al., "Present Status of the Use of LEU in Aqueous Reactors to Produce Mo-99," 1998 International Meeting on Reduced Enrichment for Research and Test Reactors, Sao Paulo,( Oct. 18-23, 1998).
Barbry, F. "Criticality Accident Studies and Research Performed in the Valduc Criticality Laboratory, France," IAEA-TECDOC-1601: 39-48 (2008).
Barnett, C.F., "Atomic Data for Fusion, vol. 1: Collisions of H, H2, He and Li Atoms with Molecules," ORNL "Redbooks" 6086 (1990).
Barschall, H.H., "Intense Sources of Fast Neutrons," Ann. Rev. Nuclear Part. Sci. 28:207-237 (1978).
Biodex, Pulmonex II® Xenon System: http://www.biodex.com/radio/lungvent/lung_502feat.htm. Accessed: (Jun. 1, 2010).
Bosch, H., et al. "Improved Formulas for Fusion Cross-Sections and Thermal Reactivities," Nuclear Fusion 32:4:611-631 (1992).
Bradley, E. et al., "Homogeneous Aqueous Solution Nuclear Reactors for the Production of Mo-99 and Other Short Lived Radioisotopes," IAEA-TECDOC-1601: 1-13 (2008).
Brown, R. W., "The Radiopharmaceutical Industry's Effort to Migrate Toward Mo-99 Production Utilizing LEU," The 2005 RERTR International Meeting, (Nov. 6-10, 2005).
Bunker, M.E. "Status Report on the Water Boiler Reactor," Los Alamos Technical Reports LA-2854 (Oct. 1963).
Calamai, P., "Chalk River Crisis Sired by AECL," TheStar.com, (Jan. 19, 2008).
Cappiello, C. et al., "Lessons Learned from 64 Years of Experience with Aqueous Homogeneous Reactors," Los Alamos National Laboratory Report LA-UR-10-02947 (May 2010).
Celona, L. et al., "Status of the TRASCO Intense Proton Source and Emittance Measurements," Rev. of Sci. Instrum. 75:5: 1423 (2004).
Chakin, V.P., et al. "High dose neutron irradiation damage in beryllium as blanket material," Fusion Engineering and Design 58-59: 535-541 (Nov. 2001).
Chenevert, G.M. et al., "A Tritium Gas Target as an Intense Source of 14 MeV Neutrons," *Nucl. Instr, and Methods* 145: 149-155 (1977).
Cheng, Z. et al., "Preliminary Study of 99Mo Extraction Process from Uranly [sic]-Nitrate Fuel Solution of Medical Isotope Production Reactor," Homogeneous Aqueous Solution Nuclear reactors for the Production of Mo-99 and Other Short Lived Radioisotopes, IAEA-TECDOC-1601: 27-35 (2008).
Cipiti, B.B., "Fusion Transmutation of Waste: Design and Analysis of the In-Zinerator Concept," Sandia Report, SAND2006-6590, (Nov. 2006).

(56) References Cited

OTHER PUBLICATIONS

Cohilis, P., "Recent Advances in the Design of a Cyclotron-Driven, Intense, Subcritical Neutron Source," *Proc. of the Fifth European Particle Physics Conference*, EPAC'96, (Jun. 10-14, 1996).

Committee on Medical Isotope Production Without Highly Enriched Uranium, National Research Council of the National Academies. Medical Isotope Production Without Highly Enriched Uranium. The National Academies Press, Washington, DC (2009). http://www.nap.edu/catalog.php?record_id=12569 Accessed (Jun. 1, 2010).

Conner, C. et al., "Production of Mo-99 from LEU Targets Acid-side Processing," 2000 Meeting on Reduced Enrichment for Research and Test Reactors, Las Vegas, Nevada, (Oct. 1-6, 2000).

DeJesus, O.T. et al., "Preparation and Purification of 77Br-Labeled p-Bromospiroperidol Suitable for in vivo Dopamine Receptor Studies," J. Label. Comp. Radiopharm., 20: 745-756 (1983).

Deluca, P.M., "Performance of a Gas Target Neutron Source for Radiotherapy," Phys. Med. Biol., 23:5: 876-887 (1978).

Demchenko, P.O., "A Neutron Source on a Basis of a Subcritical Assembly Driven by a Deuteron Linac," Problems of Atomic Science and Technology, 46:2:31-33 (2006).

Department of Defense. "Technology Readiness Assessment (TRA) Deskbook," (May 2005).

European Patent Office Action for Application No. 09739965.3 dated Sep. 19, 2012 (4 pages).

Evaluated Nuclear Data File (ENDF): http://www-nds.iaea.org/exfor/endf.htm. Database Version of May 31, 2010. Accessed (May 3, 2010).

Fraser, S., "Special Examination Report on Atomic Energy of Canada Limited-2007," OAG Special Examination Report on Atomic Energy of Canada Limited, (Jan. 29, 2008).

Ganjali, M.R. et al., "Novel Method for the Fast Separation and Purification of Molybdenum(VI) from Fission Products of Uranium with Aminofunctionalized Mesoporous Molecular Sieves (AMMS) Modified by Dicyclohexyl-18-Crown-6 and S-N Tetradentate Schiff's Base," Analytical Letters, 38:1813-1821 (2005).

Gobin, R. et al., "High Intensity ECR Ion Source (H+, D+, H− Developments at CEA/Saclay," Rev. of Sci. Instrum. 73:2: 922 (2002).

Gohar, Y., "Accelerator-driven Subcritical Facility: Conceptual Design Development," Nuclear Instruments and Methods in Physics Research A, 562:870-874 (2006).

Hamilton, T., "Reactor Shutdown Leaves Cancer Patients in Limbo," TheStar.com, (Dec. 5, 2007).

Iaea, "Alternative Technologies for 99mTc Generators," IAEA-TECDOC-852, (Dec. 1995).

Kahn, L.H., "The Potential Dangers in Medical Isotope Production," The Bulletin Online, (Mar. 17, 2008).

King, LDP; Hammond, RP; Leary, JA; Bunker, ME; Wykoff, WR. "Gas Recombination System for a Homogeneous Reactor," Nucleonics 11:9:25-29 (Sep. 1953).

Kitten, S. et al., "Solution-reactor-produced Mo-99 using activated carbon to remore[sic] I-131," Los Alamos National Laboratory Report, LA-UR—98-522 (Jun. 1998).

Kulcinski, G.L. "Near Term Commercial Opportunities from Long Range Fusion Research," 12th Annual Meeting on the Technology of Fusion Power, (Jun. 16-20, 1996).

Kulcinski, G.L., et al., "Alternate Applications of Fusion-Production of Radioisotopes" Fusion Science and Technology 44:559 (2003).

Kuperman, A.J., "Bomb-Grade Bazaar," Bulletin of the Atomic Scientists, 62:2:44-50 (Mar./Apr. 2006).

Kwan, J.D. et al., "A 2.45 GHz High Current Ion Source for Neutron Production," 17th International Workshop on ECR Ion Sources and Their Applications, Lanzhou, China, (Sep. 17-21, 2006).

Maclachlan, A. "NRG to Study Potential for Use of LEU for Mo-99," Nuclear Fuel, 32:26, (Dec. 17, 2007).

MDS-Nordion. "Mo-99 Fact Sheet: Molybdenum-99 Fission Radiochemical": http://www.nordion.com/documents/products/Mo-99_Bel.pdf (2009). Accessed (Jun. 1, 2010).

Meade, C. et al., "Considering the Effects of a Catastrophic Terrorist Attack," RAND Center for Terrorism Risk Management Policy Report, (2006).

Mirzadeh, S., "Production Capabilities in U.S. Nuclear Reactors for Medical Radioisotopes," ORNL report, ORNL/TM-12010, (Nov. 1992).

Mutalib, A., "Full Scale Demonstration of the Cintichem Process for the Production of Mo-99 Using a Low Enriched Target," ANL Report ANL/CMT/CP-97560, (Sep. 1999).

Newsline, "Shortage of Molybdenum-99 Due to Strike at NRU Reactor," The Journal of Nuclear Medicine, 38:8, (Aug. 1997).

Nickles, R.J. "Production of a Broad Range of Radionuclides with an 11 MeV Proton Cyclotron," J Label Comp Radiopharm 30:120 (1991).

Nortier, F.M. et al., "Investigation of the thermal performance of solid targets for radioisotope production," Nucl. Instr. and Meth. A 355:236 (1995).

Ogawa, K; et al., "Development of solution behavior observation system under criticality accident conditions in TRACY," Journal of Nuclear Science and Technology 37:12:1088-1097 (Dec. 2000).

Osso, J.A., "Preparation of a Gel of Zirconium Molybdate for use in the Generators of 99Mo-99mTc Prepared with 99Mo Produced by the 98Mo(n,y)99Mo Reaction," 1998 International Meeting on Reduced Enrichment for Research and Test Reactors, (Oct. 18-23, 1998).

Piefer, G. "Performance of a Low Pressure, Helicon Driven IEC Helium-3 Fusion Device," Ph.D. Thesis (Dec. 2006).

Risler, R., "20 Years of Clinical Therapy Operation with the Fast Neutron Therapy System in Seattle," Proceedings of the Seventeenth International Conference on Cyclotrons and Their Applications, (Oct. 18-22, 2004).

Schueller, M.J. et al., "Production and Extraction of 10CO2 From Proton Bombardment of Molten 10B2O3." Am Inst Physics Press (Oct. 2002).

Sherman, J. "High-Current Proton and Deuterium Extraction Systems," *Procedings of the 2007 Particle Accelerator Conference*, Albuquerque, NM: 1835 (2007).

Sherman, J.D. et al., "A 75-keV, 140-mA Proton Injector," Rev. of Scientific Instruments 73:2 917 (Feb. 2002).

Sherman, J.D. et al., "Proton Injector for cw-Mode Linear Accelerators," AIP Conf. Proc. 1099: 102 (2008).

Song, Z. et al., "Minipermanent Magnet High-Current Microwave Ion Source," Rev. of Sci. Instrum. 77 03A305 (2006).

Stacey, W.M, "Capabilities of a DT Tokamak Fusion Neutron Source for Driving a Spent Nuclear Fuel Transmutation Reactor," Nuclear Fusion, 41:2:135-154 (2001).

Taylor, T. et al., "An Advanced High-Current Low-Emittance dc Microwave Proton Source," Nucl. Instrum. and Methods in Phys. Res Part A 336:1 (1993).

Underhill, DW. "The Adsorption of Argon, Krypton and Xenon on Activated Charcoal," Health Phs. 71:2:160-166 (1996).

Vandegrift, G. "ANL (GFV) Perspective on Conversion of Mo-99 Production from High- to Low- Enriched Uranium," Presentation to the National Academies Committee on Medical Isotope Production without Highly Enriched Uranium, Washington D.C. (Apr. 10, 2007).

Vandegrift, G. F. et al., "RERTR Progress in Mo-99 Production from LEU," 6th International Topical Meeting Research Reactor Fuel Management (RRFM), Ghent, Belgium, Mar. 17-20 (2002).

Vandegrift, G.F. et al. "Production of Mo-99 from LEU Targets Base-side Processing," Meeting on Reduced Enrichment for Research and Test Reactors, Las Vegas, Nevada, (Oct. 1-6, 2000).

Von Hippel, F.N. et al., "Feasibility of Eliminating the Use of Highly Enriched Uranium in the Production of Medical Radioisotopes," Science and Global Security, 14:151-162 (2006).

Vucina, J. L. "Elution Efficiency of Mo-99/Tc-99m Generators," Facta Universitatis—Series: Physics, Chemistry and Technology, 2:3:125-130 (2001).

Weidner, J.W. et al. "Production of 13N via Inertial Electrostatic Confinement Fusion," Fusion Science and Technology 44: 539 (2003).

(56) References Cited

OTHER PUBLICATIONS

William, B. et al., "Proliferation Dangers Associated with Nuclear Medicine: Getting Weapons-Grade Uranium Out Of Radiopharmaceutical Production," Medicine, Conflict and Survival, 23:4:267-281 (Dec. 2007).
Zabetakis, M.G., "Flammability Characteristics of Combustible Gases and Vapors," Bulleltin 627, US Bureau of Mines (1965).
Ziegler, J. "Stopping and Range of Ions in Matter," www.srim.org (2008) Accessed (Jun. 1, 2010).
Bussard, R.W. "Some Physics Considerations of Magnetic Inertial-Electrostatic Confinement: A New Concept for Spherical Converging-flow Fusion," Fusion Technology 19: 273 (1991).
Collins, K.E. et al., "Extraction of High Specific Activity Radionuclides from Reactor-Irradiated [alpha]—Phthalocyanine Targets," Radiochem. Radioanalyt. Lett. 41: 129-132 (1979).
DeJesus, O.T. et al., "Production and Purification of Zr-89, a Potential PET Antibody Label," Appl. Radiat. Isotopes., Int.J. Radiat. Appl. Instr. Part A, 41:789-790 (1990).
Galy, J. et al., "A Neutron Booster for Spallation Sources-Application to Accelerator driven Systems and Isotope Production," Nuc. Instr. & Methods in Physics Res., 485:3:739-752 (2002).
Hirsch, R. L. "Inertial-Electrostatic Confinement of Ionized Fusion Gases" J. App. Phys. 38:4522-4534 (1967).
Kulcinski, G. L., "Non-electric power, near term applications of fusion energy" 18th Symposium on Fusion Engineering, Albuquerque, NM, USA (1999) 5-8.
Lone, M.A., "Syrup Neutron Cross Sect. 10-40 JV1eV. Rep.:" BNL-NCS-50681, pp. 79-116 (1977).
Olhoett, G., "Applications and Frustrations in Using Ground Penetrating Radar," Aerospace and Electronics Systems Magazine, IEEE, 21:2:.12-20, (2002).
Radel et al., "Detection of Highly Enriched Uranium Using a Pulsed D-D Fusion Source," Fusion Science and Technology, vol. 52. No. 4, pp. 1087-1091 (2007).
Russoto, R.L. et al., "Measurement of fuel ion temperatures in ICF implosions using current mode neutron time of flight detectors" Review of Scientific Instrumentation, 61:10:3125-3127 (1990).
Sabatier, J.M., "A Study on the Passive Detection of Clandestine Tunnels," 2008 IEEE Conference on Technologies for Homeland Security, pp. 353-358, (May 12-13, 2008).
Schiller et al., "Electron Beam Technology," Wiley-Interscience p. 59; Fig. F (XP002545103) (1982).
Stolarczyk, L.G., "Detection of Underground Tunnels with a Synchronized Electromagnetic Wave Gradiometer," AFRL-VS-HA-TR-2005-1066, ARFL Technical Report, (2005).
Yoshikawa, K., et al., "Research and development of landmine detection system by a compact fusion neutron source", 16th Topical Meeting on Fusion Energy, Madison, WI, USA, O-I-6.4 (2004) 1224-1228.
Chinese Office Action for Application No. 200980123452.6 dated Feb. 17, 2013 (12 pages—English Translation).
Chinese Office Action for Application No. 200980123452.6 dated Feb. 11, 2014 (16 pages, English Translation included).
Japanese Office Action for Application No. 2011/507694 dated Jun. 4, 2013 (Translation and Original, 9 pages).
PCT/US2011/23024 International Search Report and Written Opinion dated Dec. 6, 2011 (14 pages).
International Search Report and Written Opinion for Application No. PCT/US2013/031837 dated Dec. 6, 2013 (9 pages).
PCT/US2008/088485 International Search Report and Written Opinion dated Dec. 18, 2009 (14 pages).
PCT/US2009/042587 International Preliminary Report on Patentability dated Nov. 11, 2010 (9 pages).
PCT/US2009/042587 International Search Report and Written Opinion dated Dec. 16, 2009 (9 pages).
United States Patent Office Action for U.S. Appl. No. 12/990,758 dated May 7, 2014 (14 pages).
Japanese Office Action for Application No. 2011/507694 dated Jul. 24, 2014 (3 pages).
Chinese Patent Office Action for Application No. 201510976878.3 dated Nov. 13, 2017 (10 pages).
United States Patent Office Action for U.S. Appl. No. 13/575,826 dated Nov. 24, 2017 (20 pages).
United States Patent Office Action for U.S. Appl. No. 13/460,033 dated Nov. 16, 2017 (18 pages).
Chinese Patent Office Action for Application No. 200980123452.6 dated Oct. 23, 2014 (14 pages, English translation included).
Chinese Patent Office Action for Application No. 2013800188654 dated Jul. 26, 2017 (16 pages, English translation included).
Chinese Patent Office Action for Application No. 201510976878.3 dated Mar. 3, 2017 (22 pages, English translation included).
Japanese Patent Office Action for Application No. 2011-507694 dated Feb. 9, 2015 (3 pages—Statement of relevance included).
Korean Patent Office Action for Application No. 10-2010-7027045 dated Mar. 30, 2015 (10 pages—English translation included).
United States Patent Office Action for U.S. Appl. No. 12/990,758 dated Mar. 23, 2015 (17 pages).
United States Patent Office Action for U.S. Appl. No. 13/460,033 dated Apr. 17, 2015 (13 pages).
United States Patent Office Action for U.S. Appl. No. 13/575,826 dated Apr. 20, 2015 (13 pages).
Japanese Patent Office action for Application No. 2013-249823 dated Nov. 10, 2014 (2 pages—Statement of relevance included).
Tkac, P. et al., "Speciation of molybdenum (IV) in aqueous and organic phases of selected extraction systems," Separation Science and Technology (2008) 43:2641-2675.
Canadian Patent Office Action for Application No. 2723224 dated Jun. 10, 2016.
Korean Patent Office Action for Application No. 10-2010-7027045 dated Feb. 15, 2016.
Chinese Patent Office Action for Application No. 201380018865.4 dated Feb. 2, 2016.
European Patent Office Action for Application No. 09739965.3 dated Nov. 26, 2015.
United States Patent Office Action for U.S. Appl. No. 13/575,826 dated Feb. 5, 2016 (13 pages).
United States Patent Office Action for U.S. Appl. No. 13/460,033 dated Mar. 7, 2016 (12 pages).
United States Patent Office Action for U.S. Appl. No. 12/990,758 dated Jul. 21, 2016 (14 pages).
United States Patent Office Action for U.S. Appl. No. 13/575,826 dated Jul. 27, 2018 (17 pages).
Chinese Patent Office Action for Application No. 2013800188654 dated Apr. 17, 2018 (7 pages, English translation included).
United States Patent Office Action for U.S. Appl. No. 13/460,033 dated Jun. 26, 2018 (17 pages).
Russian Patent Office Decision to Grant a Patent for Invention dated for Application No. 2014144290 dated Jan. 26, 2018 (14 pages).
Bürck et al., "Sorption Behaviour of Molybdenum on Different Metal Oxide Ion Exchangers," Solvent Extraction and Ion Exchange 6.1,1988, 167-182. Abstract available online: <https://www.tandfonline.com/doi/abs/10.1080/07366298808917930>.
Canadian Patent Office Action for Application No. 2,869,559 dated Jan. 25, 2019 (4 pages).
United States Patent Office Action for U.S. Appl. No. 13/460,033 dated Jan. 10, 2019 (21 pages).
United States Patent Office Action for U.S. Appl. No. 13/575,826 dated Mar. 15, 2019 (23 pages).
United States Patent Office Action for U.S. Appl. No. 15/644,497 dated Jul. 16, 2019 (17 pages).
United States Patent Office Action for U.S. Appl. No. 13/460,033 dated Aug. 15, 2019 (37 pages).
Korean Patent Office Action for Application No. 10-2014-7031068 dated Aug. 28, 2019 (10 pages, English translation included).
United States Patent Office Action for U.S. Appl. No. 13/575,826 dated May 18, 2020 (28 pages).
Canadian Patent Office Action for Application No. 2,869,559 dated Jan. 22, 2020 (4 pages).
United States Patent Office Action for U.S. Appl. No. 15/644,497 dated Feb. 10, 2020 (16 pages).
United States Patent Office Notice of Allowance for U.S. Appl. No. 13/460,033 dated Mar. 24, 2020 (8 pages).

(56) References Cited

OTHER PUBLICATIONS

Piefer et al., "Mo-99 Production Using a Subcritical Assembly,"—Mo-99 2011—1st Annual Molybdenum-99 Topical Meeting, Dec. 2011 <https://mo99.ne.anl.gov/2011/pdfs/Mo99%202011%20Web%20Papers/S6-P3_Piefer-Paper.pdf> 7 pages.
Canadian Patent Office Action for Application No. 2,869,559 dated Nov. 6, 2020 (4 pages).
United States Patent Office Action for U.S. Appl. No. 15/644,497 dated Sep. 21, 2020 (14 pages).
United States Patent Office Action for U.S. Appl. No. 15/644,497 dated Apr. 16, 2021 (16 pages).
United States Patent Office Notice of Allowance for U.S. Appl. No. 13/575,826 dated Dec. 11, 2020 (8 pages).

* cited by examiner

AQUEOUS ASSEMBLY AND CONTROL METHOD

CROSS-REFERENCE TO RELATED APPLICATIONS

This patent application is a national stage filing under 35 U.S.C. 371 of International Patent Application No. PCT/US2013/031837, filed Mar. 15, 2013, which claims priority to U.S. Provisional Patent Application No. 61/620,735, filed Apr. 5, 2012, the entire contents of all of which are incorporated by reference herein. Priority to these applications is hereby claimed.

INTRODUCTION

The invention relates to aqueous assemblies.

In an aqueous assembly, a vessel contains a fissile material dissolved in an aqueous solution. Because the fissile material is dissolved in solution, these assemblies tend to have large negative temperature and void coefficients of reactivity caused by the expansion of the solution. Where an aqueous assembly is used in the production of medical isotopes, for example, it is desirable to operate the aqueous assembly at relatively high power levels and, where subcritical, at relatively high neutron multiplication factors. However, the large negative temperature and void coefficients of reactivity can cause undesirable reactivity loss and/or power oscillations, thereby limiting the operating parameters of the aqueous assembly.

SUMMARY

In some embodiments, provided is an aqueous assembly having a negative coefficient of reactivity with a magnitude. The aqueous assembly includes a vessel and an aqueous solution, with a fissile solute, supported in the vessel. A reactivity stabilizer is disposed within the aqueous solution to reduce the magnitude of the negative coefficient of reactivity of the aqueous assembly.

In other embodiments, provided are methods of operating an aqueous assembly having a coefficient of reactivity with a magnitude. A vessel is provided. An aqueous solution, including a fissile solute, is added to the vessel. A reactivity stabilizer is added to the aqueous solution, thereby reducing the magnitude of the coefficient of reactivity. A fission reaction is sustained within the aqueous solution.

Other aspects of the invention will become apparent by consideration of the detailed description and accompanying drawings.

DETAILED DESCRIPTION

Before any embodiments are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. It also is specifically understood that any numerical range recited herein includes all values from the lower value to the upper value, e.g., all possible combinations of numerical values between the lowest value and the highest value enumerated are to be considered to be expressly stated in this application. For example, if a concentration range is stated as 1% to 50%, it is intended that values such as 2% to 40%, 10% to 30%, or 1% to 3%, etc., or if a parameter is stated as 0.95-0.99, it is intended that values such as 0.96-0.98, 0.95-0.98, etc. are expressly enumerated in this specification. These are only examples of what is specifically intended.

The devices and methods presented herein may be used with various types and configurations of aqueous assemblies, including, for example, both critical and subcritical aqueous assemblies.

Figure 1:
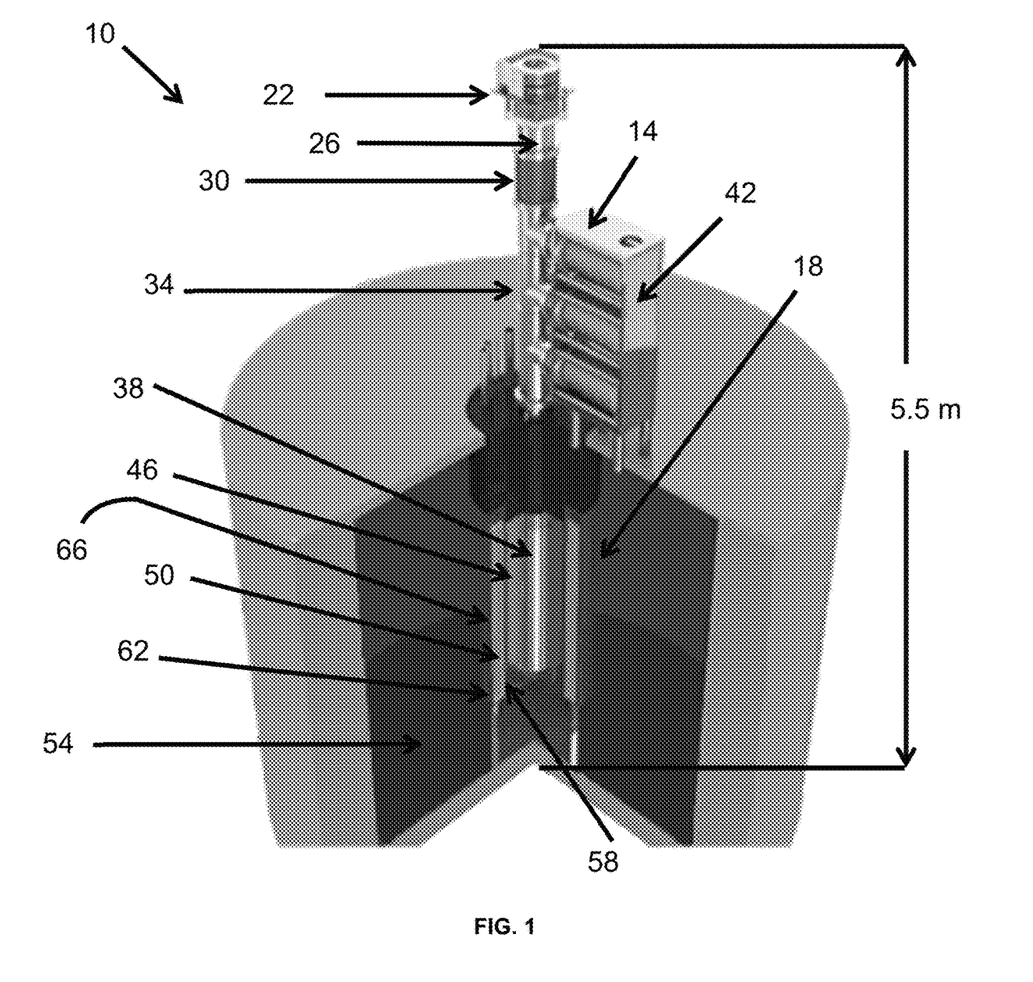
FIG. 1 is a cutaway view of a subcritical hybrid, including a neutron source assembly and an aqueous assembly.

Referring to FIG. 1, a subcritical hybrid 10 includes a neutron source assembly 14 and an aqueous assembly, more specifically, an aqueous target assembly 18.

The neutron source assembly 14 includes an RF-driven plasma ion source 22. The ion source 22 receives a feed gas, such as a tritium (T) and deuterium (D) mixture. The ion source 22 generates and collimates an ion beam, including $D^+$ and $T^+$ ions, directed along a predetermined pathway 26.

An accelerator 30 receives the $D^+$ and $T^+$ ion beam and accelerates the ion beam to yield an accelerated $D^+$ and $T^+$ ion beam. The accelerator 30 may include a series of acceleration electrodes, or electrostatic plates, for accelerating the $D^+$ and $T^+$ ion beam.

An accelerator target portion 34 of the neutron source assembly 14 receives the accelerated ion beam. The accelerator target portion 34 includes a gas target chamber 38 and, in the illustrated embodiment, a differential pumping system 42. The gas target chamber 38 contains a nuclear particle-deriving target gas that is reactive with the accelerated beam and, in turn, emits nuclear particles, i.e., protons or neutrons. In one construction, the target gas chamber 38 is filled with an approximately equal mix of D and T gas.

Gases that leak from the gas target chamber 38 into the differential pumping section 42 pass through high speed pumps, through a cold trap, and back into the target chamber. The cold traps remove heavier gasses that in time can contaminate the system due to very small leaks.

The accelerated $D^+$ and $T^+$ ion beam striking a mixed target gas of D and T produces D-T and T-D reactions, resulting in the emission of neutrons.

In some constructions of the invention, a neutron multiplier 46 substantially surrounds the gas target chamber. The neutron multiplier 46 may be substantially formed of beryllium or uranium. Multiplication occurs when energetic neutrons from the gas target chamber split beryllium atoms into two helium nuclei and an additional neutron via (n,2n) reactions or when neutrons undergo (n,2n), (n,3n), or (n,f) reactions with uranium. For example, a 14.1 MeV neutron has enough energy to react this way a few times before dropping below the multiplication threshold.

The aqueous target assembly 18 includes a target solution vessel (TSV) 50 and is surrounded by a shield tank 54. The TSV 50 includes an inner wall 58 and an outer wall 62, with an annular target solution volume 66 defined between the inner wall 58 and the outer wall 62. The TSV 50 may be formed, for example, of zircaloy, stainless steel, or aluminum. The TSV 50 substantially surrounds the gas target chamber 38 and, where applicable, the neutron multiplier 46.

The TSV 50 receives an aqueous solution, including a fissile solute, in the annular target solution volume 66. The fissile solute may include U-235 in the form of low enriched uranium (LEU), natural uranium, or other fissionable materials. The uranium may be converted into a salt (e.g., uranyl nitrate, uranyl sulfate, uranyl phosphate, uranyl carbonate, or uranyl fluoride) to increase the solubility, and the pH may be adjusted to further increase solubility. The aqueous solution may include uranium in a concentration of at least about 10 grams-U/liter, at least about 20 grams-U/liter, at least about 30 grams-U/liter, at least about 40 grams-U/liter, at least about 60 grams-U/liter, at least about 80 grams-U/liter, at least about 100 grams-U/liter, at least about 120 grams-U/liter, at least about 140 grams-U/liter, at least about 160 grams-U/liter, at least about 180 grams-U/liter, at least about 200 grams-U/liter, at least about 220 grams-U/liter, at least about 240 grams-U/liter, at least about 260 grams-U/liter, at least about 280 grams-U/liter, or at least about 300 grams-U/liter. The aqueous solution may include uranium in a concentration of less than about 800 grams-U/liter, less than about 750 grams-U/liter, less than about 700 grams-U/liter, less than about 650 grams-U/liter, less than about 600 grams-U/liter, less than about 550 grams-U/liter, less than about 500 grams-U/liter, less than about 450 grams-U/liter, or less than about 400 grams-U/liter. The aqueous solution may include uranium in a concentration of 10 grams-U/liter to about 800 grams-U/liter, about 20 grams-U/liter to about 700 grams-U/liter, about 40 grams-U/liter to about 600 grams-U/liter, about 40 grams-U/liter to about 500 grams-U/liter, or about 50 grams-U/liter to about 400 grams-U/liter. In some embodiments, uranium concentrations in the aqueous solution may be in the range of 10 grams-U/liter to 800 grams-U/liter. In some embodiments, uranium concentrations in the aqueous solution may be in the range of 40 grams-U/liter to 500 grams-U/liter.

In order to substantially maximize the production of medical isotopes with the subcritical hybrid, while substantially ensuring that subcriticality is maintained, an effective neutron multiplication factor ($k_{eff}$) of the system is calculated for a given uranium concentration and enrichment using neutronics computer codes. Neutronics codes that can be used for this analysis included MCNP5, HELIOS, VARIANT, PN2ND, PHOENIX/ANC, KENO, DENOVO, and many others. Desired uranium concentrations and enrichments may then be calculated for a desired $k_{eff}$.

The $k_{eff}$ is a measure of a system's proximity to criticality, where:
$k_{eff}$<1.0 is subcritical
$k_{eff}$=1.0 is critical
$k_{eff}$>1.0 is supercritical In order to substantially maximize the productivity of medical isotopes, while substantially ensuring that subcriticality is maintained, it is desirable to operate the subcritical hybrid 10 with $k_{eff}$ of the aqueous target assembly 18 close to 1.0 (e.g., 0.9500-0.9995), because higher $k_{eff}$ values increase the efficiency of the system due to increased subcritical multiplication. The hybrid 10 may be operated with $k_{eff}$ of at least about 0.7000, at least about 0.7500, at least about 0.8000, at least about 0.8500, at least about 0.9000, or at least about 0.9500. The hybrid 10 may be operated with $k_{eff}$ of less than about 0.9995, less than about 0.9990, less than about 0.9980, less than about 0.9970, less than about 0.9960, less than about 0.9950, or less than about 0.9900. The hybrid 10 may be operated with $k_{eff}$ of 0.7000 to 0.9995, 0.7500 to 0.9995, 0.8000 to 0.9995, 0.9000 to 0.9995, 0.9500 to 0.9995, or 0.9900 to 0.9995.

Figure 4:
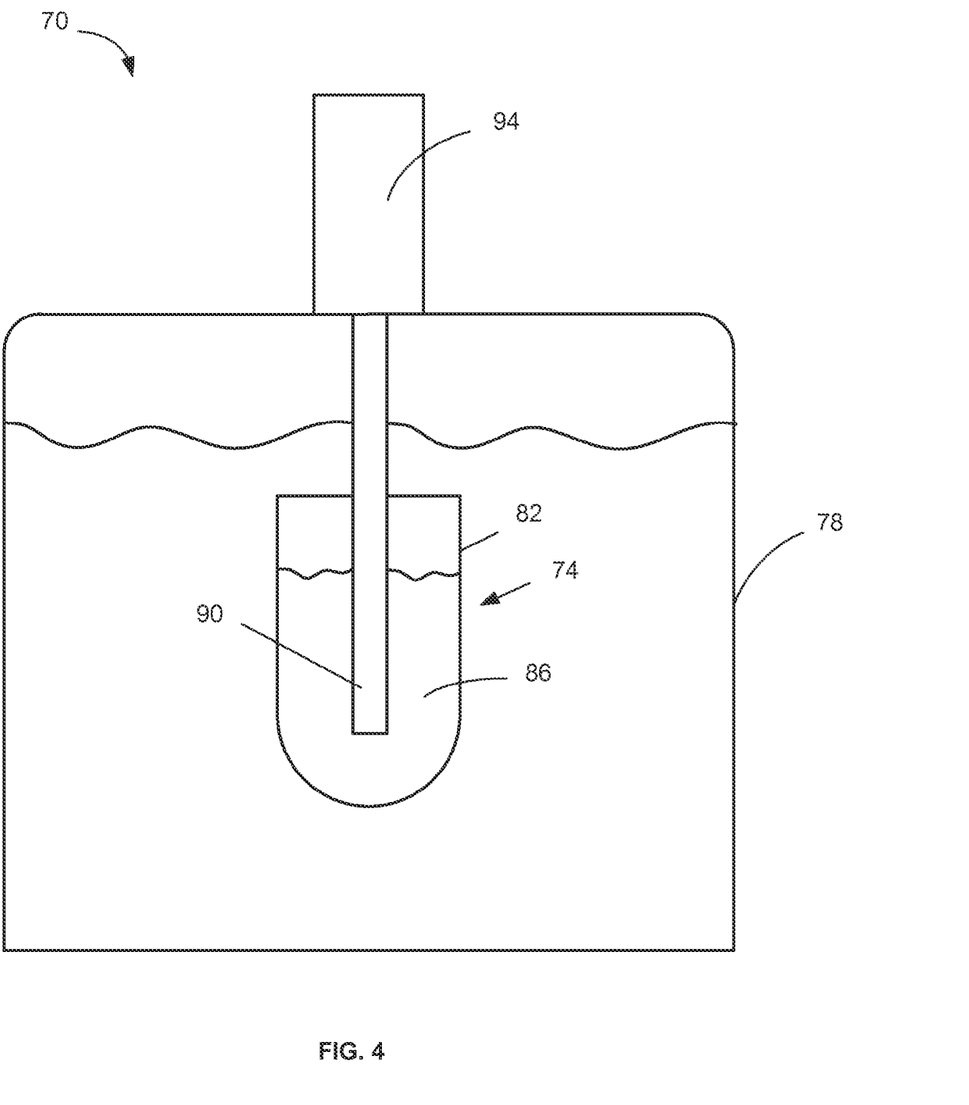
FIG. 4 is a cross sectional view of an aqueous reactor.

FIG. 4 is a cross-sectional view of an aqueous reactor 70. The aqueous reactor 70 includes an aqueous assembly 74 (e.g., an aqueous assembly capable of criticality) disposed within a shield tank 78. The aqueous assembly 74 includes a reactor vessel 82 supporting a volume of aqueous solution 86. The aqueous solution 86 includes a fissile solute. The fissile solute may include U-235 in the form of low enriched uranium (LEU), natural uranium, or other fissile materials. The uranium may be converted into a salt (e.g., uranyl nitrate, uranyl sulfate, or uranyl fluoride) to increase the solubility, and the pH may be adjusted to further increase solubility. The aqueous solution 86 includes at least a critical mass of the fissile solute. The critical mass of the fissile solute depends upon its nuclear properties (e.g. the fission cross-section), the fissile solute's enrichment and concentration within the solution, the density of the solution, the shape of the solution within the reactor vessel, the solution temperature, neutron reflectivity of the surroundings, and other factors.

A control rod 90 is selectively positionable within the aqueous assembly 74. The control rod 90 includes a material having a high neutron capture cross section. This material may include silver, indium, and cadmium. Other elements that can be used include, for example, boron, cobalt, hafnium, dysprosium, gadolinium, samarium, erbium, and europium, or their alloys and compounds, e.g., high-boron steel, silver-indium-cadmium alloy, boron carbide, zirconium diboride, titanium diboride, hafnium diboride, gadolinium titanate, and dysprosium titanate.

The control rod 90 is positioned within the aqueous assembly 74 by a control rod drive mechanism (CRDM) 94. Inserting the control rod 90 deep within aqueous solution 86 of the reactor vessel 82 reduces the reactivity of the aqueous assembly 74, thereby keeping the aqueous assembly 74 from becoming inadvertently critical (i.e., the control rod maintains $k_{eff}$<1.0). As the control rod 90 is controllably withdrawn from the solution by the CRDM 94, fewer neutrons are captured, and the reactivity within the aqueous assembly 74 increases until $k_{eff}$=1.0 (i.e., the aqueous assembly 74 is critical). Continuing to withdraw the control rod 90 would continue to insert positive reactivity. If the control rod 90 is withdrawn rapidly, and sufficient positive reactivity is inserted into the aqueous assembly 74, the aqueous assembly 74 could become prompt critical: the point where fission can be sustained utilizing prompt neutrons alone. However, this positive rod reactivity may be counteracted by other effects that result in negative reactivity, including warming of the solution and the formation of voids within the solution due to radiolysis, or even boiling.

Since the fissile atoms (e.g., uranium-235) are in solution in an aqueous assembly (e.g., the subcritical aqueous target assembly 18 or the aqueous assembly 74), the mass concentration of uranium decreases as the solution expands with increasing temperature. This expansion displaces uranium from the more neutronically important "high-worth" central region of the TSV 50 (FIG. 1) or the reactor vessel 82 (FIG. 4), and moves the uranium to a free surface of the solution, which is a "low-worth" region.

The thermal expansion effect is compounded by the increase in average neutron energy as the solution's temperature is increased. The increase in thermal neutron temperature decreases the probability of causing fission of uranium-235 relative to the other events that could occur (e.g., escape from the system, capture in low-lying resonances, etc.). This effect may result in a strongly negative temperature coefficient of reactivity. The temperature coefficient of reactivity ($\alpha_T$) is a measure of the change in the reactivity of the system per unit increase in temperature. $\alpha_T$ predicts the change in $k_{eff}$ for a change in temperature of the aqueous solution. $\alpha_T$ of embodiments of the subcritical hybrid 10 or of the aqueous reactor 70 are estimated to be approximately −10 pcm/° F. at 100° F. Values of $\alpha_T$ may be calculated with a neutronics computer code. The value of $\alpha_T$ may be at least about −100, at least about −90, at least about −80, at least about −70, at least about −60, or at least about −50. The value of $\alpha_T$ may be less than about −1, less than about −2, less than about −3, less than about −4, less than about −5, less than about −6, less than about −7, less than about −8, less than about −9, or less than about −10. The value of $\alpha_T$ may be −100 to −1, −90 to −2, −80 to −3, −70 to −4, or −60 to −5.

In addition to the negative $\alpha_T$, aqueous assemblies, such as the subcritical aqueous target assembly 18 (FIG. 1) or aqueous assembly 74 (FIG. 4), also have a strong negative void coefficient ($\alpha_{void}$). $\alpha_{void}$ is a measure of the change in the reactivity of the system per unit increase of gas or void. Aqueous systems have a negative void coefficient due to a similar effect as described for thermal expansion (as void is added to the solution, it displaces uranium from the high-worth central region to the low-worth region at the solution surface). Values of $\alpha_{void}$ may be calculated with a neutronics computer code. The value of $\alpha_{void}$ may be at least about −500 pcm/(% void), at least about −450, at least about −400, at least about −350, at least about −300, at least about −250, at least about −200, at least about −150, or at least about −100. The value of $\alpha_{void}$ may be less than about −10, less than about −20, less than about −30, less than about −40, or less than about −50. The value of $\alpha_{void}$ may be −500 to −10, −450 to −20, −400 to −30, −350 to −40, or −300 to −50 pcm/(% void).

The large negative $\alpha_T$ and $\alpha_{void}$ can cause two potential issues with aqueous systems: reactivity oscillations and reduced output. Reactivity oscillations can occur as a result of any transients induced on the system (e.g., power change, or pressure change) or due to natural oscillations (e.g., turbulent flow). For example, if the temperature increases, the reactivity feedback mechanisms will cause power to drop, which will lead to a temperature decrease and a subsequent power increase. The cycle will continue until it is externally damped by control systems or until it naturally decays.

The second potential issue is reduced output. For the subcritical aqueous target assembly 18, the output may be reduced because the strong negative temperature and void coefficients result in lower $k_{eff}$ values, thereby reducing the subcritical multiplication of the system. The strong negative $\alpha_T$ and $\alpha_{void}$ may result in a reduction in the operating power level of the system to ensure that there is enough safety margin in the design to account for the power oscillations.

By reducing the magnitude of $\alpha_T$ and $\alpha_{void}$, one can reduce the impact of both of these issues.

Certain isotopes have very large capture cross sections for neutrons while also decreasing in density and/or absorbance with a temperature increase, and these isotopes may be called reactivity stabilizers. Reactivity stabilizers absorb neutrons from a nuclear system, preventing the neutrons from causing fission. Some examples of reactivity stabilizers include, but are not limited to, boron-10, gadolinium-155, and gadolinium-157. Boron-10 may be added to the aqueous solution in the form of boric acid (i.e., $H_3BO_3$ or $B(OH)_3$). Boric acid may be particularly desirable due to high solubility and low pH. In addition to using soluble boric acid, other physical placements of the boron could be used. Such devices include fixed plates or rods containing boron. Commercial boron-aluminum alloys may be used due to their chemical and radiation stability. Another option would be to place the boron in separate tubes filled with concentrated boric acid.

By adding these reactivity stabilizers to the aqueous solution in the TSV 50 (FIG. 1) or the reactor vessel 82 (FIG. 4), the relative importance of the uranium in the solution can be reduced since the reactivity stabilizer competes for neutrons with the uranium. As such, when the solution temperature is increased (or increases), the solution expansion not only removes some of the uranium from the high-worth central region, but also removes some of the reactivity stabilizer. The net effect is that the strong negative $\alpha_r$ is reduced in magnitude.

A similar response is achieved with $\alpha_{void}$. An increase in solution void displaces the reactivity stabilizer as well as the uranium. Therefore, the reactivity impact of an additional bubble in the solution is reduced due to the competing effects of loss of uranium and loss of reactivity stabilizer.

Figure 3:
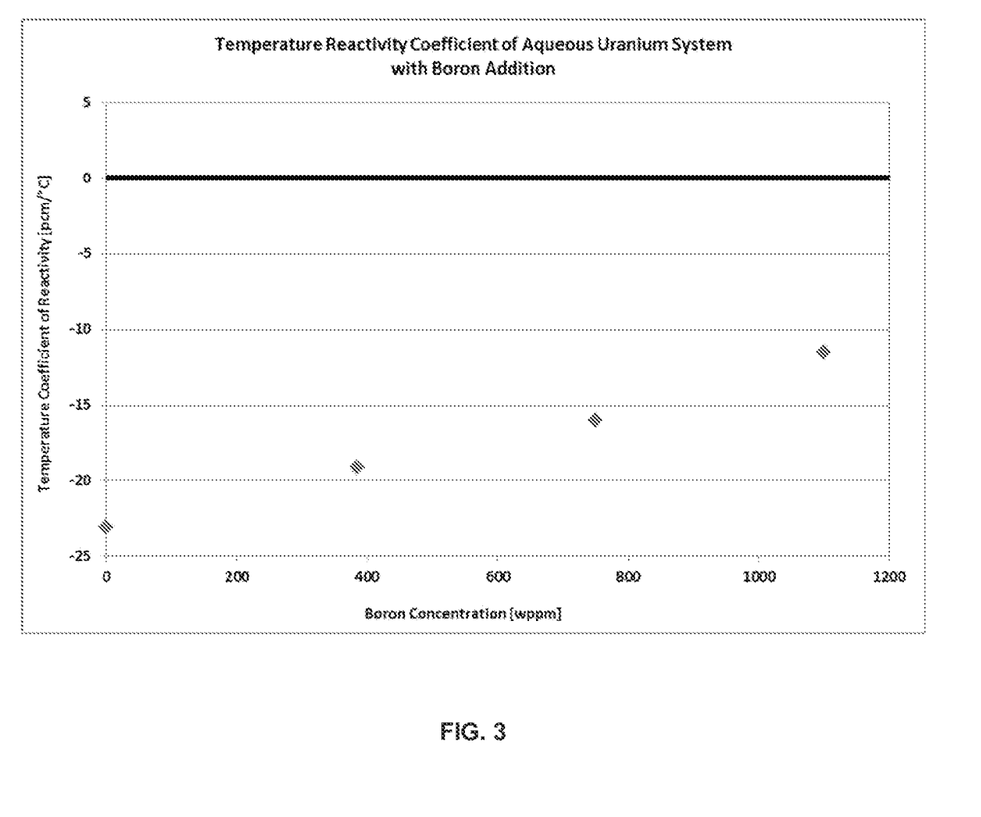
FIG. 3 is a graph of boron concentration in an aqueous uranium solution versus a temperature coefficient of reactivity of the aqueous assembly.

By adjusting the concentration of the reactivity stabilizers, one can shape the reactivity feedback coefficients $\alpha_T$ and $\alpha_{void}$ to any desired levels. For example, the reactivity stabilizer concentration may be chosen to lessen the magnitude of $\alpha_T$ and $\alpha_{void}$, while still keeping them negative. Negative coefficients help ensure that an increase in system power leads to a decrease in reactivity (self-limiting device); however, coefficients that are too negative lead to the power oscillations described above. FIG. 3 illustrates temperature coefficient of reactivity ($\alpha_T$) of a subcritical aqueous target assembly at several selected boron concentrations, showing the reduced magnitude of the temperature coefficient as the boron concentration increases.

Figure 2:
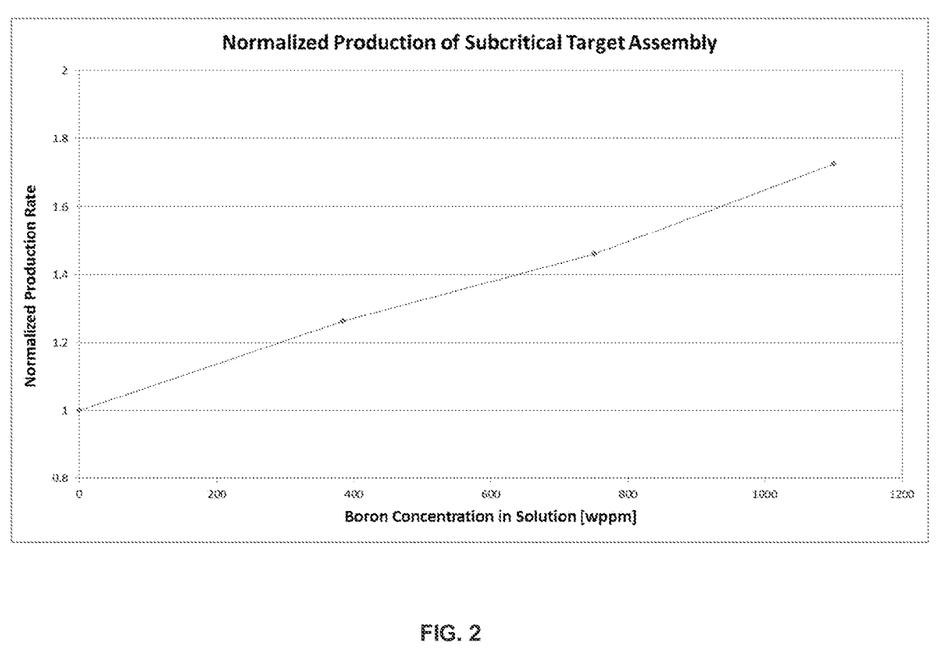
FIG. 2 is a graph of boron concentration in a target solution versus a normalized isotope production rate of a subcritical aqueous assembly.

Ultimately, the decreased reactivity coefficients offer increased stability ($\alpha_T$ and $\alpha_{void}$) when operating the subcritical hybrid assembly 10, due to the reduced reactivity oscillations. This increased stability also allows for increased production rates of medical isotopes. Because reactivity oscillations are minimized, the subcritical hybrid assembly may be operated with a higher effective neutron multiplication factor ($k_{eff}$). FIG. 2 is a graph of boron concentration in a target solution versus a normalized production rate of a subcritical assembly, showing the increase in productivity as the boron concentration increases.

Figure 5:
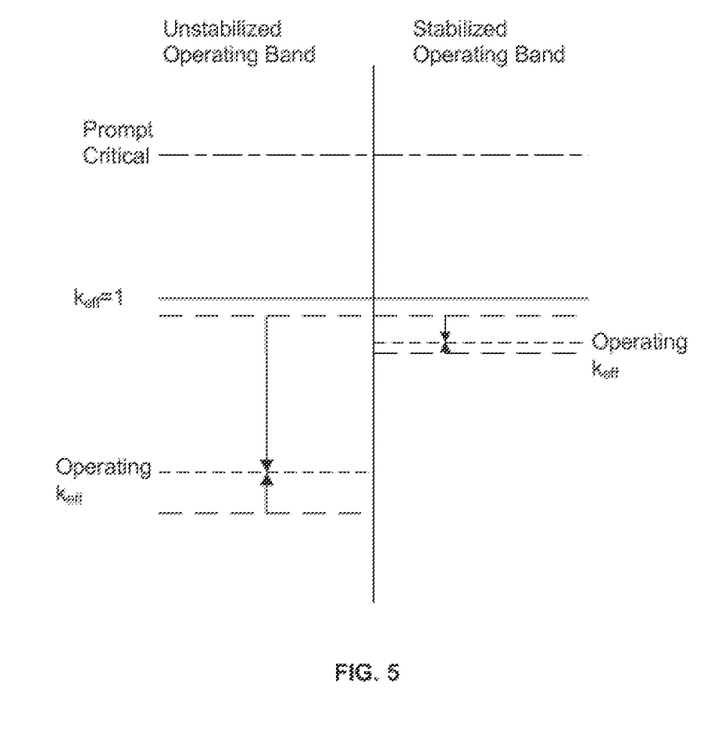
FIG. 5 is a graph comparing subcritical operating bands of stabilized and unstabilized subcritical aqueous assemblies.

FIG. 5 illustrates $k_{eff}$ operating bands of a subcritical aqueous assembly. For a subcritical aqueous assembly without the use of reactivity stabilizers, the $k_{eff}$ operating band is wide, due to oscillations in temperature and void reactivity as a result of the large $\alpha_T$ and $\alpha_{void}$. In order to reduce the chance of criticality, a typical operating $k_{eff}$ value of the unstabilized operating band is undesirably far from $k_{eff}$=1.0, which reduces the efficiency of operating the subcritical aqueous assembly due to reduced subcritical multiplication. In comparison, an aqueous assembly including reactivity stabilizers has a narrower $k_{\textit{eff}}$ operating band due to reduced oscillations in temperature and void reactivity, as a result of the reducing the magnitudes of $\alpha_T$ and $\alpha_{\textit{void}}$. Moreover, the typical operating $k_{\textit{eff}}$ value of the stabilized operating band is closer to $k_{\textit{eff}}=1.0$, while still maintaining the same margin from criticality in the operating band, thereby increasing the efficiency of operating the subcritical aqueous assembly by increasing subcritical multiplication.

Figure 6:
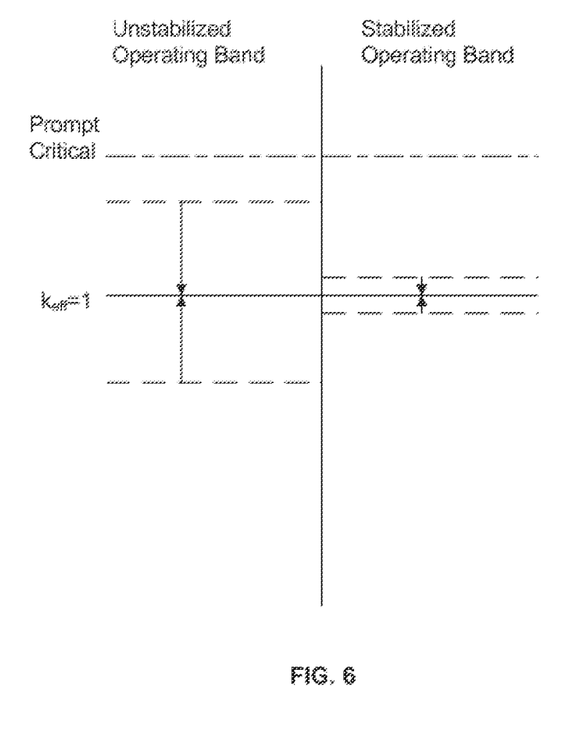
FIG. 6 is a graph comparing operating bands of stabilized and unstabilized critical aqueous assemblies.

FIG. 6 illustrates $k_{\textit{eff}}$ operating bands of a critical aqueous assembly. For a critical aqueous assembly without the use of reactivity stabilizers, the $k_{\textit{eff}}$ operating band is wide due to oscillations in temperature and void reactivity as a result of the large $\alpha_T$ and $\alpha_{\textit{void}}$. When operating critically, the upper limit of the operating band is undesirably close to prompt criticality. In comparison, a critical aqueous assembly including reactivity stabilizers has a narrower $k_{\textit{eff}}$ operating band due to reduced oscillations in temperature and void reactivity as a result of reducing the magnitudes of $\alpha_T$ and $\alpha_{\textit{void}}$. Moreover, the margin to prompt criticality is greater, thereby increasing a safety margin of the critical aqueous assembly.

Example 1

The subcritical hybrid is provided, including the neutron source assembly, neutron multiplier, and aqueous assembly. An aqueous solution is provided in the TSV. The aqueous solution includes a fissile solute, including LEU.

Desired concentrations of boron, or other reactivity stabilizers, may be calculated using a neutronics computer code. An operator may select desired values of $k_{\textit{eff}}$, $\alpha_T$, and $\alpha_{\textit{void}}$, and then calculate a boron concentration. Other input values to the neutronics code include operating conditions of the hybrid assembly, e.g., the geometries of the TSV, shield tank, and neutron multiplier, as well as the volumes, solution chemistry, densities of all materials, source particle energies, nuclear cross section data, and temperatures of all materials.

Once a desired boron concentration is calculated, a boron or boric acid addition is prepared and added to the aqueous solution.

$\alpha_T$ and $\alpha_{\textit{void}}$ are calculated for a desired soluble reactivity stabilizer concentration. A first $k_{\textit{eff}}$ value ($k_{\textit{eff}1}$) is determined to a high degree of accuracy using a base case. Then a small perturbation is made in the variable of interest (e.g., solution temperature), and the new $k_{\textit{eff}}$ value ($k_{\textit{eff}2}$) is calculated. Optionally, a second perturbation is then made in the opposite direction from the base case, and a third $k_{\textit{eff}}$ value is calculated.

The reactivity coefficient ($\alpha_T$ or $\alpha_{\textit{void}}$) is then calculated from $(k_{\textit{eff}1}-k_{\textit{eff}2})/(k_{\textit{eff}1}*k_{\textit{eff}2})/\Delta Z$, where $\Delta Z$ is the perturbation in the variable of interest. The two perturbations are used to confirm the calculated reactivity coefficient ($\alpha_T$ or $\alpha_{\textit{void}}$), to determine the slope of the reactivity coefficient, and to provide better statistics through averaging.

Once the subcritical hybrid is operating, $\alpha_T$ and $\alpha_{\textit{void}}$ are measured through a combination of instrumentation and calculation. For instance, $\alpha_T$ can be inferred by observing the effects of temperature on the power of the system. The temperature of the solution will be measured (at a few specific locations in the solution), and this measured temperature is then mapped to a bulk temperature using fluid dynamics calculations. The power or neutron flux is then measured at that temperature. By knowing the source neutron term, this neutron flux or power can be correlated to a known $k_{\textit{eff}}$ in the system. Then a change in temperature (or change in void) is imposed on the system (such as by altering cooling flow), and the process is repeated. The reactivity coefficient ($\alpha_T$ or $\alpha_{\textit{void}}$) is then calculated using the same formula as above.

Example 2

The aqueous reactor is provided, including the aqueous assembly. An aqueous solution is provided in the reactor vessel. The aqueous solution includes fissile solute of known concentration and enrichment.

Desired concentrations of boron, or of other reactivity stabilizers, may be calculated using a neutronics computer code. An operator may select desired values of $\alpha_T$, and $\alpha_{\textit{void}}$, and then calculate a boron concentration. Other input values to the neutronics code may include operating conditions of the aqueous reactor, e.g., the geometries of the reactor vessel and shield tank, as well as the volumes, solution chemistry, densities of all materials, source particle energies, nuclear cross section data, and temperatures of all materials.

Once a desired boron concentration is calculated, a boron or boric acid addition is prepared and added to the aqueous solution.

$\alpha_T$ and $\alpha_{\textit{void}}$ are calculated for a desired soluble reactivity stabilizer concentration. The two perturbations are used to confirm the calculated reactivity coefficient ($\alpha_T$ or $\alpha_{\textit{void}}$) to determine the slope of the reactivity coefficient and to provide better statistics through averaging.

Once the aqueous reactor is operating, $\alpha_T$ and $\alpha_{\textit{void}}$ are measured through a combination of instrumentation and calculation. For instance, $\alpha_T$ can be inferred by observing the effects of temperature on the power of the system. The temperature of the solution will be measured (at a few specific locations in the solution), and this measured temperature is then mapped to a bulk temperature using fluid dynamics calculations. The power or neutron flux is then measured at that temperature. The reactivity coefficient ($\alpha_T$ or $\alpha_{\textit{void}}$) is then calculated using the same formula as above.

Thus, the invention provides, among other things, an aqueous assembly and a control method for the same. Various features and advantages of the invention are set forth in the following claims.

What is claimed is:

1. A subcritical aqueous assembly having a negative coefficient of reactivity, the aqueous assembly comprising:
   a vessel;
   an aqueous solution, including a fissile solute including uranium, supported in the vessel;
   a neutron source for maintaining a fission reaction with the fissile solute at a subcritical level within the vessel; and
   a reactivity stabilizer disposed within the aqueous solution to reduce a magnitude of the negative coefficient of reactivity of the subcritical aqueous assembly during operation of the subcritical aqueous assembly, wherein the reactivity stabilizer includes boric acid.

2. The aqueous assembly of claim 1, wherein the coefficient of reactivity is a solution temperature coefficient of reactivity.

3. The aqueous assembly of claim 1, wherein the coefficient of reactivity is a solution void coefficient of reactivity.

4. The aqueous assembly of claim 1, wherein the fissile solute includes at least one of uranyl nitrate, uranyl sulfate, and uranyl fluoride.

5. The aqueous assembly of claim 1, wherein the reactivity stabilizer includes boron-10.

6. The aqueous assembly of claim 1, wherein the reactivity stabilizer further includes at least one of gadolinium-155 and gadolinium-157.

7. The aqueous assembly of claim 1, further comprising a control rod, at least a portion of the control rod being selectively disposed within the aqueous solution to at least partially control a reactivity within the aqueous solution.

8. A method of operating a subcritical aqueous assembly having a negative coefficient of reactivity with a magnitude, the method comprising:
adding an aqueous solution, including a fissile solute including uranium, to a vessel;
adding a reactivity stabilizer to the aqueous solution, wherein the reactivity stabilizer includes boric acid;
operating a neutron source to sustain a fission reaction with the fissile solute of the aqueous solution at a subcritical level; and
reducing the magnitude of the negative coefficient of reactivity of the subcritical aqueous assembly during operation of the subcritical aqueous assembly.

9. The method of claim 8, further comprising withdrawing a control rod until the aqueous solution achieves criticality.

10. The method of claim 8, wherein the reactivity stabilizer includes boron-10.

11. The method of claim 8, wherein the reactivity stabilizer further includes at least one of gadolinium-155 and gadolinium-157.

12. The method of claim 8, wherein reducing the magnitude of the coefficient of reactivity includes reducing a magnitude of a negative temperature coefficient of reactivity.

13. The method of claim 8, wherein reducing the magnitude of the coefficient of reactivity includes reducing a magnitude of a negative void coefficient of reactivity.

14. A subcritical aqueous assembly having a negative coefficient of reactivity, the aqueous assembly comprising:
a vessel;
an aqueous solution, including a fissile solute including uranium, supported in the vessel;
a neutron source for maintaining a fission reaction with the fissile solute at a subcritical level within the vessel; and
a reactivity stabilizer disposed within the aqueous solution to reduce a magnitude of the negative coefficient of reactivity of the subcritical aqueous assembly during operation of the subcritical aqueous assembly, wherein the reactivity stabilizer is a solute of the aqueous solution.

15. The aqueous assembly of claim 14, wherein the coefficient of reactivity is a solution temperature coefficient of reactivity.

16. The aqueous assembly of claim 14, wherein the coefficient of reactivity is a solution void coefficient of reactivity.

17. The aqueous assembly of claim 14, wherein the fissile solute includes at least one of uranyl nitrate, uranyl sulfate, and uranyl fluoride.

18. The aqueous assembly of claim 14, wherein the reactivity stabilizer includes at least one of boron-10, gadolinium-155, and gadolinium-157.

19. The aqueous assembly of claim 14, further comprising a control rod, at least a portion of the control rod being selectively disposed within the aqueous solution to at least partially control a reactivity within the aqueous solution.

20. A method of operating a subcritical aqueous assembly having a negative coefficient of reactivity with a magnitude, the method comprising:
adding an aqueous solution, including a fissile solute including uranium, to a vessel;
adding a reactivity stabilizer to the aqueous solution, wherein the reactivity stabilizer is a solute of the aqueous solution;
operating a neutron source to sustain a fission reaction with the fissile solute of the aqueous solution at a subcritical level; and
reducing the magnitude of the negative coefficient of reactivity of the subcritical aqueous assembly during operation of the subcritical aqueous assembly.

21. The method of claim 20, further comprising withdrawing a control rod until the aqueous solution achieves criticality.

22. The method of claim 20, wherein the reactivity stabilizer includes at least one of boron-10, gadolinium-155, and gadolinium-157.

23. The method of claim 20, wherein reducing the magnitude of the coefficient of reactivity includes reducing a magnitude of a negative temperature coefficient of reactivity.

24. The method of claim 20, wherein reducing the magnitude of the coefficient of reactivity includes reducing a magnitude of a negative void coefficient of reactivity.

* * * * *